3,808,214
1-(3-BROMO-4-HYDROXYMETHYLPHENYL)-4-
(4'-BROMO)-PHENACYLPIPERAZINE
Adolph Oscar Geiszler, Mundelein, Ill., assignor to Abbott
Laboratories, North Chicago, Ill.
No Drawing. Filed June 16, 1972, Ser. No. 263,582
Int. Cl. C07d 51/70
U.S. Cl. 260—268 PH      1 Claim

ABSTRACT OF THE DISCLOSURE

Covers 1-(3-bromo-4-hydroxymethylphenyl) - 4 - (4'-bromo)-phenacylpiperazine and its method of preparation.

DETAILED DESCRIPTION OF THE INVENTION

The first step in preparing the compound of the invention is to provide as reactants m-bromoaniline and diethanol amine. These reactants are heated together, say at 150–250° C. in the presence of a strong mineral acid such as hydrochloric acid, hydrobromic acid, sulfuric acid, etc. The amine reactant is generally present in the slight excess, usually 5–15%.

The m-bromophenylpiperazine produced in step one above is then reacted with ethylformate. The reaction itself is exothermic. Generally after the exothermic reaction has subsided the reaction mass is further heated at a temperature of 75–125° C. for ½–4 hours.

The 1-(3-bromophenyl)-4-formylpiperazine produced above is then formylated to produce an aldehyde group ortho to the bromo group on the bromophenyl ring. A wide variety of dialkyl or aryl alkyl formamides may be used here as reactants. Preferred is dimethyl formamide. The reaction is usually carried out in presence of phosphorous oxychloride or phosgene. The reaction temperature should be maintained relatively low, say within the range of 10–30° C. Since the reaction itself is exothermic, an external source of cooling is necessary.

In step four the 1-(3-bromo-4-formylphenyl)-4-piperazine produced above is reacted in order to reduce the aldehyde group on the bromophenyl ring. Usually a salt is first formed by addition of such acids as hydrochloric, hydrobromic, sulfuric, nitric, etc. acids. After neutralization the salt is then reduced. A wide variety of known reducing agents may be used here. A typical reducing reagent is sodium borohydride in a base such as sodium hydroxide.

The last step of the reaction involves reaction of 3-bromo-4-hydroxymethylphenylpiperazine with 2,4' - dibromoacetophenone in presence of an amine base such as triethylamine to produce the desired final piperazine product. Normally this reaction is carried out in the presence of a solvent such as chloroform, benzene etc. After the reactants are added normally the reaction is carried to completion by heating the reaction mass. In a typical situation the reaction mass is heated to reflux temperature for 1–3 hours.

The following examples illustrate preparation of intermediates useful in forming the piperazine of the invention as well as the final preparation of this compound.

EXAMPLE I

To a stirred mixture of 210 g. of diethanolamine and 309.4 g. of m-bromoaniline was slowly added 400 ml. of 48% aqueous hydrogen bromide. The reactants were heated to 200° C. while distilling off water. Approximately 300 ml. of water was collected. The heating was continued at 200–210° C. (internal temperature) for 4–6 hours, after which time all the water had been removed. The mixture was cooled to 110–120° C. and poured into 1200 ml. of water. The water solution was stirred until all the materials were in solution. Thereafter, an amount of 50% sodium hydroxide solution was added until a pH of 11–12 was reached. The solution was then extracted with 3 portions of benzene, each 200 ml. The benzene extracts were washed with 5 portions of water, each 100 ml. Thereafter, the benzene extracts were dried over anhydrous magnesium sulfate. The magnesium sulfate was removed by filtration and the resultant solvent distilled at atmospheric pressure. The residue was then distilled under reduced pressure. The product had a boiling point of 120–125° C. at 0.2 mm. of mercury. The refractive index of the product was $N_D^{25}$ 1.6187.

The overall equation of the above reaction is as follows:

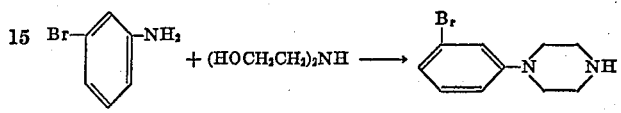

EXAMPLE II

The m-bromophenylpiperazine intermediate of Example I was added in an amount of 120.5 grams to a a stirred solution of 66.6 grams of ethyl formate. During the addition the mixture became hot. After the initial reaction had subsided the reaction mass was heated on a steambath for 2 hours. Thereafter, the material was distilled at reduced pressure. The boiling point of the product, 1-(3-bromophenyl)-4-formylpiperazine was 172–178° C. at 0.15 mm. of mercury. The refractive index of the product $N_D^{25}$ was 1.6200.

61.25 grams of 1-(3-bromophenyl)-4-formylpiperazine was dissolved in 50 ml. of dimethylformamide. This solution was added to a solution of 138.9 grams of phosphorous oxychloride in 225 ml. of dimethylformamide while maintaining the reaction temperature below 20° C. via cooling with an ice water bath. After the addition was completed, the reaction mixture was slowly heated to 60–65° C. and maintained at this temperature for 6 hours. Thereafter, the reaction mixture was poured onto cracked ice and made basic by addition of 50% sodium hydroxide. The vessel was cooled and scratched to induce solidification of the oil layer. Solid material was collected on a filter and washed 3 times with water. The solid was then dried in a vacuum oven at 50° C. This solid had a melting point of 117–122° C. In order to further purify this product is was first dissolved in hot acetone and then treated with 4–5 grams of activated charcoal. The hot solution was then filtered. The solution was cooled to allow the product to crystallize from the acetone solution. The 1-(3'-bromo-4'-formylphenyl)-4-formylpiperazine product had a melting point of 121–123° C.

The reaction equation is as follows:

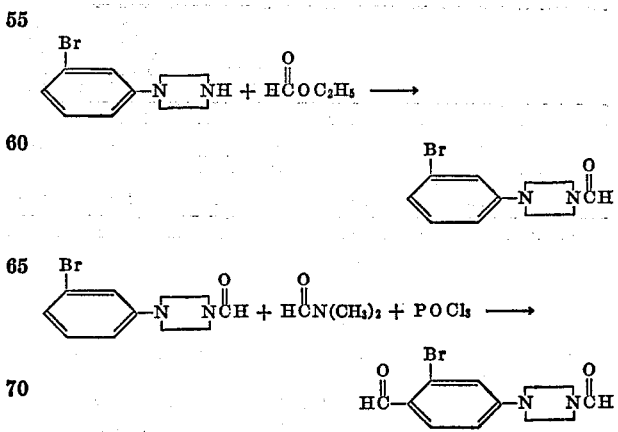

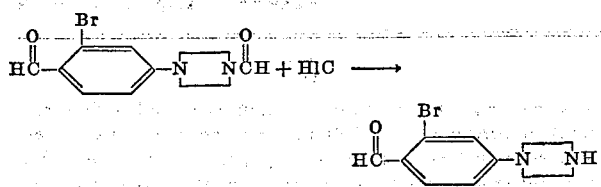

EXAMPLE III

Here the intermediate of Example II, namely, 1-(3'-bromo-4'-formylphenyl)-4'-formylpiperazine was acidified by adding 120 ml. of 7% hydrochloric acid to 33.05 grams of the piperazine. The reaction was carried out by heating on a steambath until a homogenous solution was obtained, and thereafter heated an additional 20 minutes. The reaction mass was allowed to cool and stand for 48 hours. The solid material was collected on a filter and washed with water, and the resultant product, 3-bromo-4-formylphenylpiperazine hydrochloride was obtained having a melting point of approximately 279° C. dec. 23.7 grams of the above hydrochloride derivative was then suspended in 250 ml. of methanol. To this was added a solution of sodium hydroxide prepared by adding 3.08 grams of sodium hydroxide to 20 ml. of water. A yellow solution was formed when the base was added. To this yellow solution was then added 3.8 grams of sodium borohydride over a 3 minute period while maintaining the reaction temperature below 10° C. The reaction temperature was allowed to warm to room temperature and then stirred for 1 hour. The reaction mixture was concentrated to dryness and the residue dissolved in chloroform. The chloroform solution was then washed with 25 ml. portions of water. Thereafter, the chloroform solution was dried over anhydrous magnesium sulfide. The drying agent was removed by filtration and the chloroform solution concentrated to dryness. The solid residue was dissolved in hot acetone and cooled to allow the material to crystallize. 17.5 grams of product, 3-bromo-4-hydroxymethylphenylpiperazine had a melting point of 124–127° C.

The above reaction sequence was as follows:

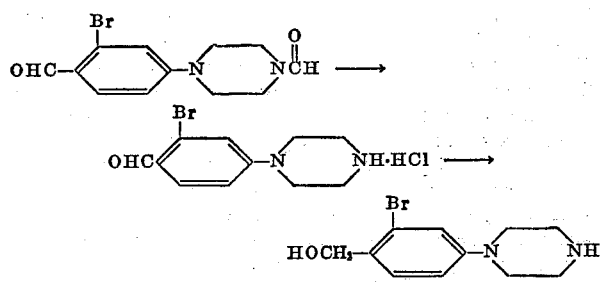

of benzene and 50 ml. of chloroform. To this solution was added 6 grams of triethylamine and 13.9 grams of 2,4'-dibromoacetophenone, whereupon the mixture was then heated to reflux temperature for 2 hours. Thereafter, 100 ml. of water was added to the stirred hot reaction mixture. The reaction mixture was cooled and solid material collected on a filter. The product was then dried in a vacuum oven at 55° C. The 1-(3-bromo-4-hydroxymethylphenyl)-4-(4'-bromo)-phenacylpiperazine product had a melting point of 167–168° C. dec.

The equation of this reaction is as follows:

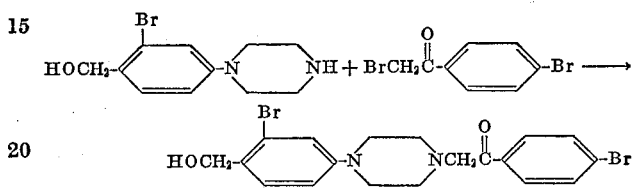

The compound of the invention 1-(3-bromo-4-hydroxymethylphenyl)-4-(4'-bromo)-phenacylpiperazine made in Example IV was then tested for its activity against S. mansoni. Mice were infected with a Puerto Rican strain of S. mansoni. The mice were exposed to 100 cercariae percutaneously from a harvest of cercariae from 25 or more infected A-glabratus to insure uniform bisexual infection.

The mice were kept for six or seven weeks in groups of 50 per cage to permit the development of mature infections. Several mice were sacrificed at the end of this period to determine the worm burden and presence of eggs in the liver and intestines of each exposure group. The mice were then divided into groups of 3 per cage and given the test compound via gavage utilizing the mouse cannula (20 gage-1⅛" length). The non-medicated group of an equal number of mice served as infected controls.

Treatment consists of 1 oral dose per day in 5 consecutive days. The animals were sacrificed two weeks later and the entire viscera was examined for presence of alive or dead worms. The liver, lungs and intestines were then pressed between 2 glass plates and examined microscopically for eggs and tissue changes resulting from the infection or treatment. The total worm burden, dead or alive, and organ changes were compared with the non-medicated controls. The results of these tests are set forth below in Table I. It is quite evident that the compound here has excellent activity against S. mansoni in mice.

TABLE I

| | Mg/kg per day | Number mice survey experiment | Average number worms alive (normal) | Recovered alive (stunted)[1] | Per mouse dead | Oogram positive/negative | Activity |
|---|---|---|---|---|---|---|---|
| Group I  Compound Ex 4 | 25 | 10/10 | 0 | 5.6 | 10.0 | 10.0 | Very active No living worms. Positive Oograms |
| Saline infection controls | 0.25 ml | 5/5 | 18.0 | 0 | 0 | 0/5 | Typical schistosome infection |
| Group II  Compound Ex 4 | 25 | 5/6 | 0 | 4.4 | 24.0 | 5/0 | Very active Only dead or stunted worms Positive Oograms. |
| Saline infection controls | 0.25 ml | 5/6 | 26.4 | 0 | 0 | 0/5 | Typical schistosome infection. |

[1] Animals were perfused with citrate-saline for total worm recovery Tissue-pressed examination were examined microscopically after perfusion.

EXAMPLE IV

Here, the final desired product of the invention was obtained.

Specifically, 13.6 grams of 3-bromo-4-hydroxymethylphenylpiperazine was dissolved in a solution of 200 ml.

In the next series of tests the compound disclosed here was tested for its effect against mature infection of S. Mansoni in hamsters. These tests were run similar to that described with respect to mice. The medication was 100 mg./kg./day for 5 days. The control received Methocel, orally under the same schedule. Again all surviving animals were sacrified and perfused at a three weeks post treatment. Results are given in Table II below.

What is claimed is:
1. 1-(3-bromo-4-hydroxymethylphenyl) - 4 - (4'-bromo)-phenacylpiperazine.

TABLE II

| Hamster No. | Total number of worms recovered | | | | Oograms changes | | Degree of activity | Comments |
|---|---|---|---|---|---|---|---|---|
| | By perfusion | | Tissue-press exam | | Posi-tive | Neg-ative | | |
| | Normal | Stunted | Alive | Dead | | | | |
| 1 | 0 | 4 | 1 (stunted) | 12/24 | + | | Very active | No normal worms—all dead or stunted. Only dead eggs in tissues or positive Oograms change. |
| 2 | 0 | 0 | 4 (stunted) | 8/16 | | — | Active | No Oogram changes due to 1 pair of normal worms found in liver/press. |
| 3 | 0 | 6 | 0 | 22/44 | + | | Very active | No normal worms found (only dead or stunted). Only dead eggs found. |
| 4 | 2 | 2 | 0 | 8/16 | | — | Active | Normal Oograms due to pair of worms not affected by compound. |
| 5 | 0 | 6 | 0 | 10/20 | | — | do | Normal Oogram due to pair of worms. |
| | 17 | 0 | 12 (normal) | ¹0 | | — | | Typical schistosome infection. |

¹ Non-medicated control.

References Cited

UNITED STATES PATENTS

| | | | |
|---|---|---|---|
| 2,830,056 | 4/1958 | Rusettig | 260—268 PH |
| 2,945,860 | 7/1960 | Schmidt Barbo | 260—268 PH |
| 3,558,629 | 1/1971 | Archer et al. | 260—268 PH |

DONALD G. DAUS, Primary Examiner

U.S. Cl. X.R.

260—268 L; 424—258